US008406766B2

(12) United States Patent
Watanabe et al.

(10) Patent No.: US 8,406,766 B2
(45) Date of Patent: Mar. 26, 2013

(54) RADIO COMMUNICATION SYSTEM, NEIGHBOR CELL LIST OPTIMIZING SYSTEM, BASE STATION, AND NEIGHBOR CELL LIST UPDATING METHOD

(75) Inventors: Yoshinori Watanabe, Minato-ku (JP); Kojiro Hamabe, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/510,786

(22) PCT Filed: Sep. 17, 2010

(86) PCT No.: PCT/JP2010/066146
§ 371 (c)(1),
(2), (4) Date: May 18, 2012

(87) PCT Pub. No.: WO2011/061990
PCT Pub. Date: May 26, 2011

(65) Prior Publication Data
US 2012/0225657 A1 Sep. 6, 2012

(30) Foreign Application Priority Data

Nov. 19, 2009 (JP) ................................. 2009-263782

(51) Int. Cl.
*H04W 36/00* (2009.01)
(52) U.S. Cl. .................. 455/436; 455/67.11; 455/422.1; 455/443; 455/452.2; 455/513; 455/512; 455/516; 455/62; 455/63.1; 455/61.2; 370/328; 370/331; 370/332; 370/333; 370/252
(58) Field of Classification Search .............. 455/67.11, 455/436, 422.1, 443, 452.2, 513, 512, 516, 455/62, 63.1, 226.2, 161.2; 370/328, 331, 370/332, 333, 329, 252
See application file for complete search history.

(56) References Cited

U.S. PATENT DOCUMENTS
(Continued)

FOREIGN PATENT DOCUMENTS
JP 2003-518889 A 6/2003
JP 2006-270207 A 10/2006
(Continued)

OTHER PUBLICATIONS

3rd Generation Pertnership Project; Technical Specification Group Radio Access Network; Evolved Universal Terrestrial Radio Access (E-UTRA) Radio Resource Control (RRC); Protocol Specification (Release 8), 2008, 3GPP, pp. 1-198; V8.4.0.

(Continued)

*Primary Examiner* — Kwasi Karikari
(74) *Attorney, Agent, or Firm* — Sughrue Mion, PLLC

(57) ABSTRACT

A neighbor cell list optimizing system according to the present invention is a neighbor cell list optimizing system that updates a neighbor cell list that is provided in a base station that manages a cell to which a mobile terminal establishes a connection and to which specific neighbor cells that are candidates of a handover destination cell for said mobile terminal of neighbor cells that are in the vicinity of said cell are registered, comprising: priority computation section that computes priorities of said neighbor cells to be registered to said neighbor cell list based on measurement information that represents radio communication qualities of neighbor cells in which the measured radio communication qualities exceed a threshold; and neighbor cell list updating section that registers neighbor cells in descending order of the priorities up to an upper limit of radio cells that can be registered to said neighbor cell list.

17 Claims, 12 Drawing Sheets

U.S. PATENT DOCUMENTS

| | | | |
|---|---|---|---|
| 7,065,361 B1 * | 6/2006 | Fortuna | 455/438 |
| 2007/0249344 A1 | 10/2007 | Hosono et al. | |
| 2008/0002628 A1 | 1/2008 | Bi et al. | |
| 2009/0047958 A1 * | 2/2009 | Rimhagen et al. | 455/436 |
| 2009/0047961 A1 | 2/2009 | Kim | |
| 2010/0075675 A1 * | 3/2010 | Yang et al. | 455/436 |

FOREIGN PATENT DOCUMENTS

| | | | |
|---|---|---|---|
| JP | 2007-295123 A | 11/2007 | |
| JP | 2008-118404 A | 5/2008 | |
| JP | 2008-153963 A | 7/2008 | |
| JP | 2008-219645 A | 9/2008 | |
| JP | 2009-147979 A | 7/2009 | |
| JP | 2009-534984 A | 9/2009 | |
| WO | 2008/005225 A2 | 1/2008 | |

OTHER PUBLICATIONS

David Soldani et al., "Self-Optimizing Neighbor Cell List for UTRA FDD Networks Using Detected Set Reporting", IEEE, 2007, pp. 694-698.

International Search Report for PCT/JP2010/066146 dated Nov. 22, 2010.

* cited by examiner

Fig.10

Tabulating terminal measurements 115

| Radio cell | Number of reports (region value) | Number of reports (average value) |
|---|---|---|
| LC#1 | $n_{L1}$ | $M_{L1}$ |
| LC#2 | $n_{L2}$ | $M_{L2}$ |
| LC#3 | $n_{L3}$ | $M_{L3}$ |
| ... | ... | ... |
| LC#K | $n_{LM}$ | $M_{LM}$ |

} Listed Cell

Tabulating terminal measurements 114

| Radio cell | Number of reports (region value) | Number of reports (average value) |
|---|---|---|
| DC#1 | $n_{D1}$ | $M_{D1}$ |
| DC#2 | $n_{D2}$ | $M_{D2}$ |
| DC#3 | $n_{D3}$ | $M_{D3}$ |
| ... | ... | ... |
| DC#K | $n_{DK}$ | $M_{DK}$ |

} Detected Cell

RADIO COMMUNICATION SYSTEM, NEIGHBOR CELL LIST OPTIMIZING SYSTEM, BASE STATION, AND NEIGHBOR CELL LIST UPDATING METHOD

CROSS REFERENCE TO RELATED APPLICATIONS

This application is a National Stage of International Application No. PCT/JP2010/066146 filed Sep. 17, 2010, claiming priority based on Japanese Patent Application No. 2009-263782 filed Nov. 19, 2009, the contents of all of which are incorporated herein by reference in their entirety.

TECHNICAL FIELD

The present invention relates to a radio communication system, a neighbor cell list optimizing system, a base station, and a neighbor cell list updating method that update a neighbor cell list.

BACKGROUND ART

Generally, a radio communication system has mobile terminals 10, radio base stations 30, and mobile communication core network 50 as shown in FIG. 1.

Mobile terminal 10 transmits and receives data such as communication traffic and control traffic to and from radio base station 30.

Radio base station 30 transmits and receives data to and from mobile terminals 10 and mobile communication core network 50 connected through wired links 40. Around radio base station 30, radio cell 35 is arranged as an effective range in which mobile terminals 10 each have radio link 20 with radio base station 30. Radio base station 30 manages radio cell 35 arranged in its own periphery, whereas mobile terminal 10 establishes a connection with radio cell 35 that radio base station 30 manages and transmits and receives data to and from radio base station 30.

Mobile communication core network 50 is composed of an exchanger and a server machine (not shown) and is connected to radio base stations 30 through respective wired links 40 and is connected to external network 70 through wired link 60 so as to transmit and receive data to and from radio base stations 30 and external network 70.

In such a radio communication system, radio parameters of radio base station 30 need to be appropriately set up so as to satisfy predetermined communication qualities in all the service areas in which services are provided. Examples of such radio parameters are total transmission powers of radio base stations 30, tilt angles on the vertical and horizontal planes of a radio base station antenna, a neighbor cell list, and a handover threshold.

In the following description, it is assumed that as radio parameter, a neighbor cell list is provided in radio base station 30.

Here, the neighbor cell list will be described.

In the radio communication system, radio cells are arranged on the plane of all the service area so as to provide services.

When mobile terminal 10 moves from the connected radio cell to another radio cell, mobile terminal 10 performs a so-called handover, which is a process that switches the connected radio cell to another radio cell. In this process, mobile terminal 10 is pre-instructed to measure radio communication qualities of the connected radio cell and its neighbor cells and to report measured radio communication qualities of the connected radio cell and the neighbor radio cells to radio base station 30 that manages the connected radio cell if the radio communication quality of the connected radio cell deteriorates. When the radio communication quality is reported from mobile terminal 10 to radio base station 30, radio base station 30 determines a handover destination radio cell.

To reduce the load imposed on mobile terminal 10 and process the handover quickly, a method that designates specific cells of neighbor cells as candidates of a handover destination radio cell is generally used. The neighbor cell list shows candidates of a handover destination radio cell. The neighbor cell list is generated when a communication carrier registers radio cells to each radio cell, and the neighbor cell list is reported to mobile terminals 10 by radio base station 30 through a downlink channel.

In the following description, radio cells that have been registered to a neighbor cell list are referred to as listed cells, whereas radio cells that have not been registered thereto are referred to as detected cells.

When the radio communication quality is reported from mobile terminal 10 to radio base station 30, radio base station 30 determines a handover destination radio cell from the listed cells whose radio communication qualities have been measured by mobile terminal 10. Therefore, mobile terminal 10 cannot perform a handover to detected cells whose radio communication qualities have not been measured by mobile terminal 10 and who radio communication qualities have not been reported to radio base station 30. Consequently, if radio cells have been omitted from the neighbor cell list, since mobile terminal 10 cannot perform a handover to an appropriate radio cell, a call may be abnormally terminated or a handover to an inappropriate radio cell may result in deterioration of radio communication qualities. Thus, it is important to generate a neighbor cell list in which radio cells have not been omitted so as to ensure good radio communication qualities.

On the other hand, an upper limit ($L_{Max}$) of the number of radio cells that can be registered to a neighbor cell list has been set up so as to reduce the load imposed on a channel through which the neighbor cell list is reported and in order to reduce the load imposed on mobile terminal 10 that needs to measure radio communication qualities of radio cells and report them to radio base station 30. Thus, it is necessary to preferentially register radio cells, that are likely to contribute to an improvement of communication qualities, to the neighbor cell list so as to register major radio cells to the neighbor cell list.

Generally, setting a neighbor cell list requires an advanced technique. The neighbor cell list has been optimized based on field test results in the service area of the radio communication system.

However, in recent years, a neighbor cell list optimizing system that autonomously optimizes a neighbor cell list during the operation of the radio communication system has been under consideration.

FIG. 2 is a schematic diagram showing an example of a structure of a radio communication system that is provided with a neighbor cell list optimizing system.

The radio communication system shown in FIG. 2 has mobile terminals 10, radio base stations 30, mobile communication core network 50, and neighbor cell list optimizing system 90. In FIG. 2, similar components to those in FIG. 1 are denoted by similar reference numerals and their description will be omitted in the following.

Neighbor cell list optimizing system 90 is connected to radio base stations 30 through wired links 80 and to mobile communication core network 50 through wired link 85.

Neighbor cell list optimizing system 90 optimizes neighbor cell lists on which radio base stations 30 manage radio cells 35.

Non-patent Literature 1 describes a neighbor cell list updating method that the neighbor cell list optimizing system performs.

FIG. 3 is a schematic diagram illustrating the neighbor cell list updating method described in Non-patent Literature 1.

In Non-patent Literature 1, it is assumed that a mobile terminal measures the received power of a pilot signal transmitted from a radio base station, as radio communication quality, and reports the measured received power to the radio base station.

In the neighbor cell list updating method described in Non-patent Literature 1, the number of handover attempts (a) to each listed cell registered in the neighbor cell list is tabulated. In addition, the number of reports (n) received from mobile terminals stating that the received power of a pilot signal is equal to or higher than a threshold regarding each detected cell is tabulated.

The neighbor cell list is updated in such a manner that detected cells in which the number of reports (n) is equal to or higher than a threshold ($Th_{Add}$) are registered in the neighbor cell list in descending order of the number of reports (n) and that listed cells in which the number of attempts (a) is equal to or lower than a threshold ($Th_{Del}$) is deleted from the neighbor cell list.

RELATED ART LITERATURE

NON-PATENT LITERATURE 1: D. Soldani, "Self-optimizing Neighbor Cell List for UTRA FDD Networks Using Detected Set Reporting", pp. 694-pp. 698, IEEE VTC2007

NON-PATENT LITERATURE 2: 3GPP TS36.331 v8.4.0, pp. 66, 2008

DISCLOSURE OF THE INVENTION

However, the neighbor cell list updating method described in Non-patent Literature 1 has the following two problems.

FIG. 4 is a schematic diagram illustrating a first problem involved in the neighbor cell list updating method presented in Non-patent Literature 1.

Tabulation table 91 shown in FIG. 4 is a table that lists the number of reports (n) stating that the received power of a pilot signal transmitted from a radio base station that manages a detected cell is equal to or higher than a predetermined threshold, whereas tabulation table 92 is a table that lists the number of handover attempts to each listed cell (a).

It is assumed that tabulation table 91 contains detected cells arranged in descending order of the number of reports (n) and that tabulation table 92 contains listed cells arranged in the descending order of the number of handover tries (a).

In tabulation table 91, detected cells (DC#1, DC#2, and DC#3) in which the number of reports (n) received from mobile terminals is equal to or higher than the threshold ($Th_{Add}$) are those to be added to the neighbor cell list. At this point, as the first problem, even if listed cells in which the number of handover attempts (a) is equal to or lower than the threshold ($Th_{Del}$) are deleted, the number of radio cells may exceed the upper limit of radio cells ($L_{Max}$) that can be registered to the neighbor cell list.

In such a case, it is necessary to decide to select radio cells from detected cells as cells to be added to the neighbor cell list and from listed cells as cells not to be deleted from the neighbor cell list and to register the selected radio cells to the neighbor cell list. However, since the criteria that decides which radio cells are to be added to the neighbor cell list is different from the criteria that decides which radio cells are to be deleted from the neighbor cell list, it is difficult to decide which radio cells are to be registered to the neighbor cell list.

FIG. 5 is a schematic diagram illustrating the second problem involved in the neighbor cell list updating method presented in Non-patent Literature 1.

Tabulation table 93 shown in FIG. 5 is a table that lists the number of reports (n) stating that the received power of a pilot signal transmitted from a radio base station that manages a detected cell is equal to or higher than a predetermined threshold, whereas tabulation table 94 is a table that lists the number of handover attempts (a) to each listed cell.

Like the case shown in FIG. 4, it is assumed that tabulation table 93 contains detected cells arranged in the descending order of the number of reports (n), whereas tabulation table 94 contains listed cells arranged in the descending order of the number of handover attempts (a).

In tabulation table 93, a detected cell (DC#1) in which the number of reports (n) is equal to or higher than the threshold ($Th_{Add}$) is a radio cell to be added to the neighbor cell list. However, even if DC#1 is added as a listed cell (LC#M+1) to the neighbor cell list, if the number of handover attempts ($a_{M+1}$) to LC#M+1 is equal to or lower than the threshold ($Th_{Del}$), it is deleted from the neighbor cell list and becomes a detected cell (DC#1) again.

Unless the neighbor radio communication environment largely changes, DC#1 is likely to become a radio cell to that is be added to the neighbor cell list and thereby the same radio cell is added to the neighbor cell list and deleted therefrom repeatedly. As a result, as the second problem, the update operation of the neighbor cell list becomes unstable.

Therefore, an object of the present invention is to provide a neighbor cell list optimizing system, a base station, and a neighbor cell list optimizing method that can solve the foregoing problems.

SUMMARY OF THE INVENTION

To accomplish the foregoing object, a radio communication system according to the present invention, comprises:

a mobile terminal;

a base station that manages a cell to which said mobile terminal establishes a connection and that is provided with a neighbor cell list to which specific neighbor cells, that are candidates of a handover destination cell for said mobile terminal of neighbor cells, that are in the vicinity of said cell, are registered; and a neighbor cell list optimizing system that updates the neighbor cell list provided in said base station, wherein said mobile terminal measures radio communication qualities of said neighbor cells and reports measurement information that represents radio communication qualities of the neighbor cells in which the measured radio communication qualities exceed a predetermined threshold to said base station, and wherein said neighbor cell list optimizing system includes:

a priority computation section that computes priorities of said neighbor cells to be registered to said neighbor cell list based on said measurement information reported to said base station; and a neighbor cell list updating section that registers neighbor cells to said neighbor cell list in descending order of the neighbor cells' priorities that are computed by said priority computation section up to an upper limit of radio cells that can be registered to said neighbor cell list.

To accomplish the foregoing object, a neighbor cell list optimizing system according to the present invention is a neighbor cell list optimizing system that updates a neighbor cell list that is provided in a base station that manages a cell to which a mobile terminal establishes a connection and to which specific neighbor cells that are candidates of a handover destination cell for said mobile terminal of neighbor cells that are in the vicinity of said cell are registered, comprises:

a priority computation section that computes priorities of said neighbor cells to be registered to said neighbor cell list based on measurement information that is reported from said mobile terminal to said base station and that represents radio communication qualities of neighbor cells in which the measured radio communication qualities exceed a predetermined threshold; and a neighbor cell list updating section that registers neighbor cells in descending order of the neighbor cells' priorities that are computed by said priority computation section up to an upper limit of radio cells that can be registered to said neighbor cell list and updates said neighbor cell list.

To accomplish the foregoing object, a base station according to the present invention is a base station that manages a cell to which said mobile terminal establishes a connection and that updates a neighbor cell list that is provided in its own base station and to which specific neighbor cells that are candidates of a handover destination cell for said mobile terminal of neighbor cells that are in the vicinity of said cell are registered, comprises:

a priority computation section that computes priorities of said neighbor cells to be registered to said neighbor cell list based on measurement information that is reported from said mobile terminal to the own station and that represents radio communication qualities of the neighbor cells in which the measured radio communication qualities exceed a predetermined threshold; and a neighbor cell list updating section that registers neighbor cells to said neighbor cell list in descending order of the neighbor cells' priorities that are computed by said priority computation section up to an upper limit of radio cells that can be registered to said neighbor cell list and updates said neighbor cell list.

To accomplish the foregoing object, a neighbor cell list updating method according to the present invention is a neighbor cell list updating method applied to a neighboring cell list optimizing system that updates a neighbor cell list that is provided in a base station that manages a cell to which a mobile terminal establishes a connection and to which specific neighbor cells that are candidates of a handover destination cell for said mobile terminal of neighbor cells that are in the vicinity of said cell are registered, comprises:

computing priorities of said neighbor cells that are registered to said neighbor cell list based on measurement information that is reported from said mobile terminal to said base station and that represents radio communication qualities of neighbor cells in which the measured radio communication qualities exceed a predetermined threshold; and registering neighbor cells in descending order of the neighbor cells' priorities that are computed by said priority computation section up to an upper limit of radio cells that can be registered to said neighbor cell list and updating said neighbor cell list.

According to the present invention, a mobile terminal measures radio communication qualities of neighbor cells that are in the vicinity of a cell to which the mobile terminal of the cell establishes a connection and reports measurement information that represents radio communication qualities of the neighbor cells, in which the measured radio communication qualities exceed a threshold, to a base station that manages the cell to which its own terminal establishes the connection and that is provided with a neighbor cell list; and a neighbor cell list optimizing system computes priorities of the neighbor cells to be registered to the neighbor cell list based on the measurement information reported to the base station, registers the neighbor cells to the neighbor cell list in descending order of the neighbor cells' priorities that are computed up to an upper limit of radio cells that can be registered to the neighbor cell list and updates the neighbor cell list.

In other words, unlike Non-patent Literature 1, in which a neighbor cell that has not been registered in a neighbor cell list is registered thereto and a neighbor cell that has been registered therein is deleted therefrom, according to this exemplary embodiment, the neighbor cell list is updated in such a manner, that regardless of whether neighbor cells have been registered in the neighbor cell list, the priorities of individual neighbor cells are computed and they are completely registered to the neighbor cell list in the descending order of the priorities up to an upper limit of neighbor cells that can be registered to the neighbor cell list.

As a result, since the number of neighbor cells registered to a neighbor cell list is equal to or lower than the upper limit of neighbor cells that can be registered to the neighbor cell list, an effect can be obtained in which neighbor cells, that exceed the maximum number of neighbor cells that can be registered to the neighbor cell list, can be prevented from changing to radio cells that are registered to the neighbor cell list.

In addition, since it is not necessary to repeatedly register and delete neighbor cells to and from the neighbor cell list, as an effect can be obtained in which the updating operation for the neighbor cell list can be prevented from becoming unstable.

BRIEF DESCRIPTION OF DRAWINGS

[FIG. 10] is a schematic diagram showing an example of management information managed by a priority computation section of a neighbor cell list optimizing system according to a third exemplary embodiment.

EXEMPLARY EMBODIMENTS

Next, with reference to the accompanying drawings, exemplary embodiments will be described.

Figure 1:
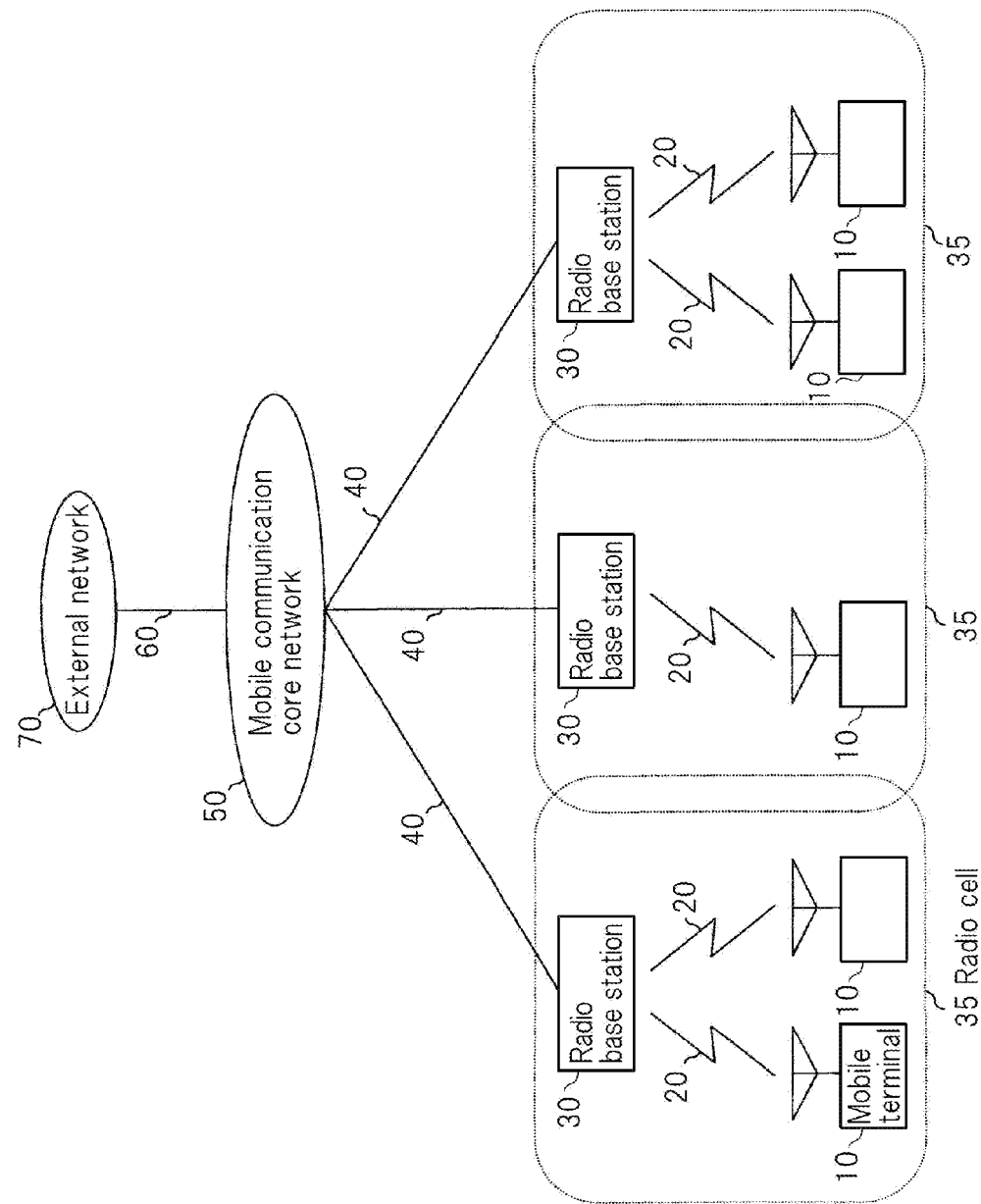
[FIG. 1] is a schematic diagram showing an example of a structure of typical radio communication system.
Figure 2:
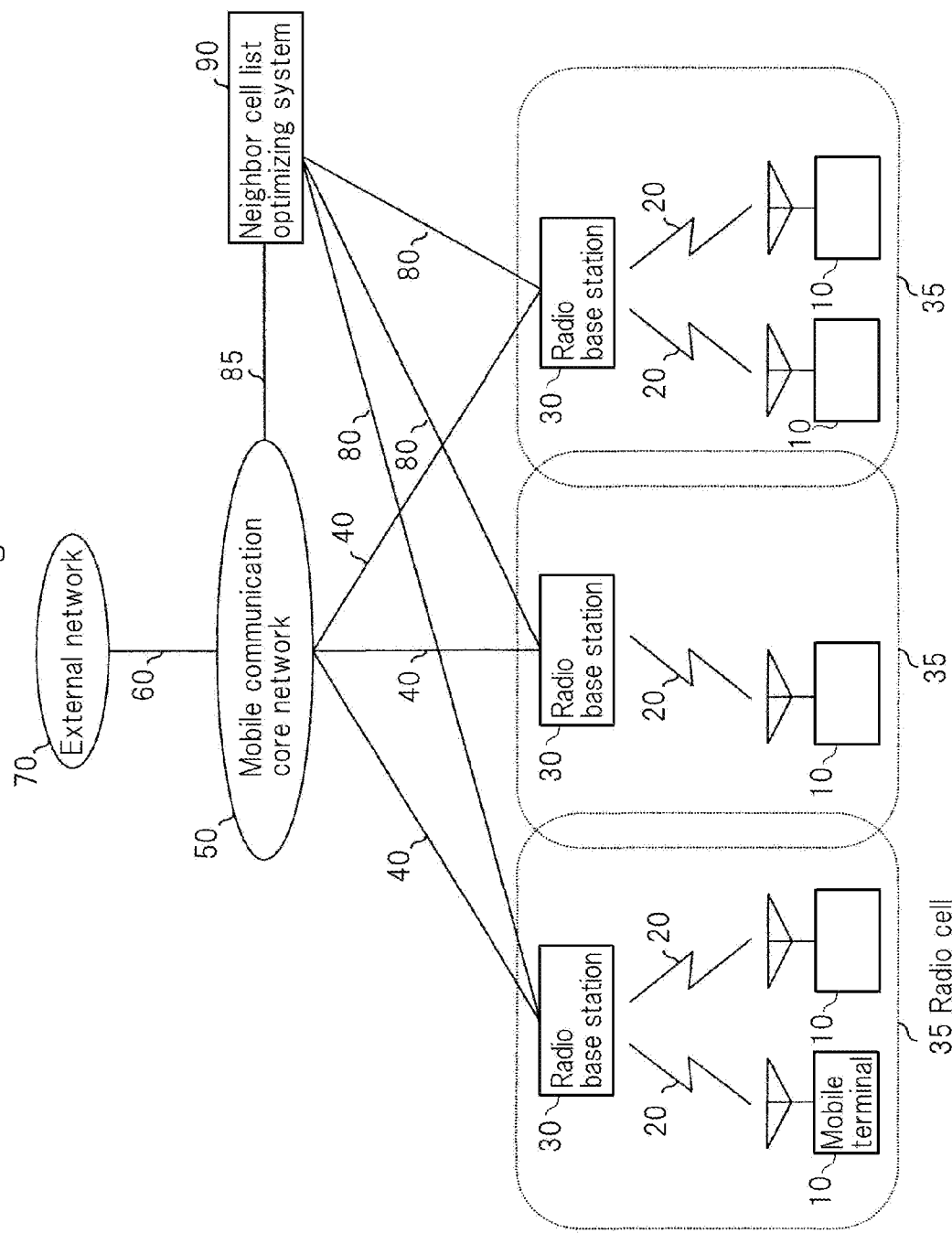
[FIG. 2] is a schematic diagram showing an example of a structure of a radio communication system that is provided with a neighbor cell list optimizing system.
Figure 3:
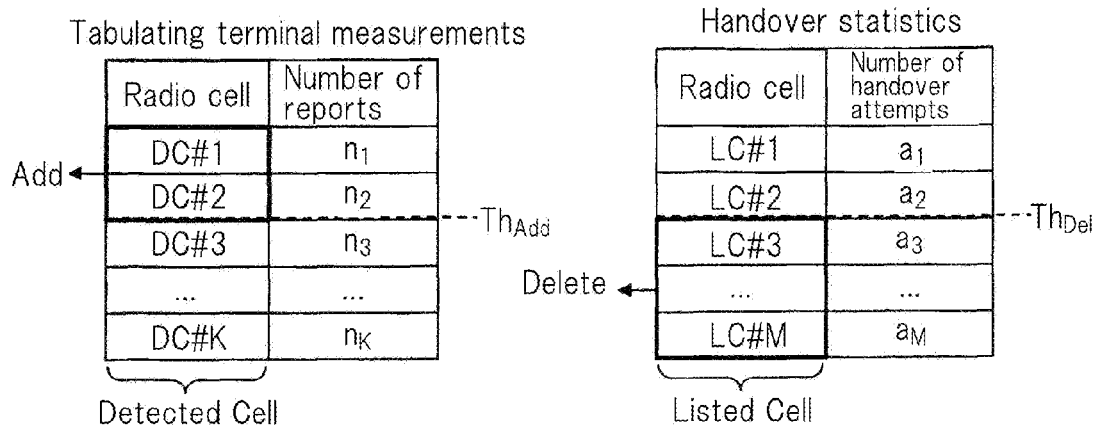
[FIG. 3] is a schematic diagram illustrating a neighbor cell list updating method presented in Non-patent Literature 1.
Figure 4:
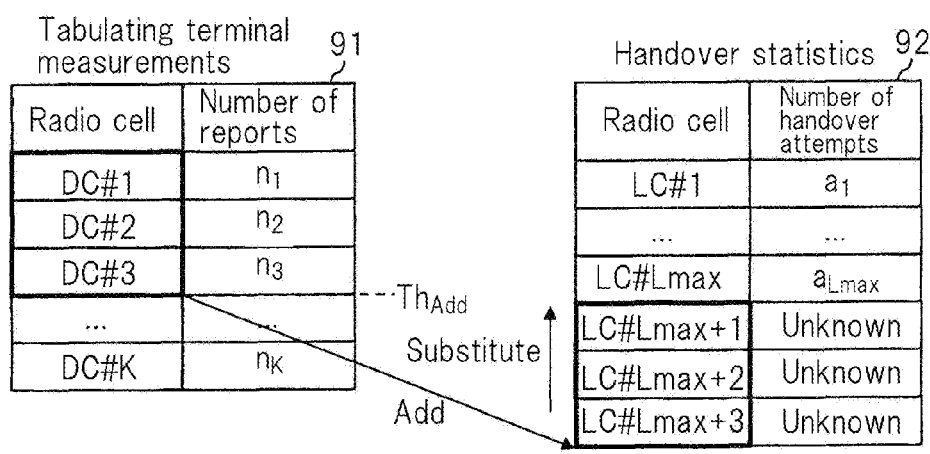
[FIG. 4] is a schematic diagram illustrating a problem involved in the neighbor cell list updating method presented in Non-patent Literature 1.
Figure 5:
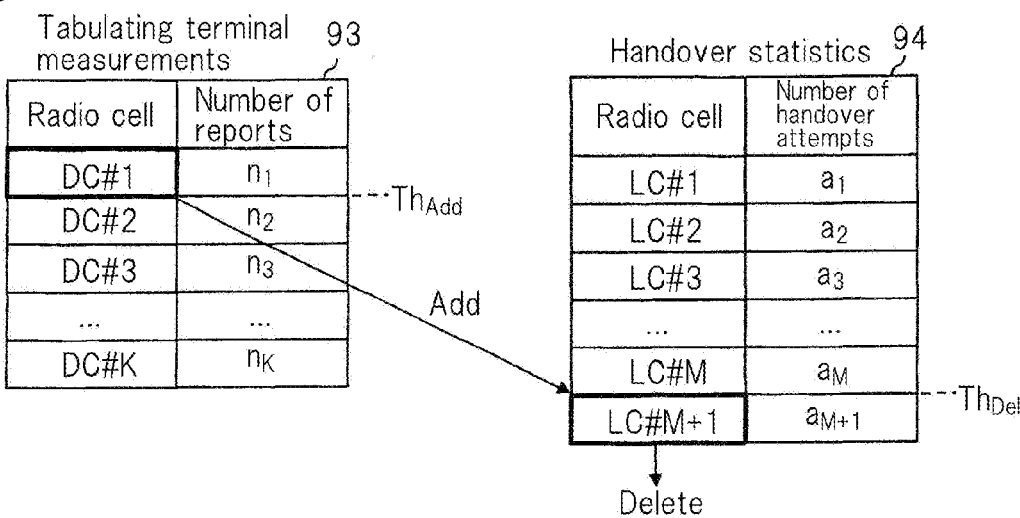
[FIG. 5] is a schematic diagram illustrating a problem involved in the neighbor cell list updating method presented in Non-patent Literature 1.

In the following, an example in which a neighbor cell list optimizing system in the radio communication system according to the present invention shown in FIG. 2 updates a neighbor cell list provided in radio base station 30 will be described. Thus, structures that have similar components to those shown in FIG. 2 are denoted by similar reference numerals and their description will be omitted in the following.

(First Exemplary Embodiment)

Figure 6:
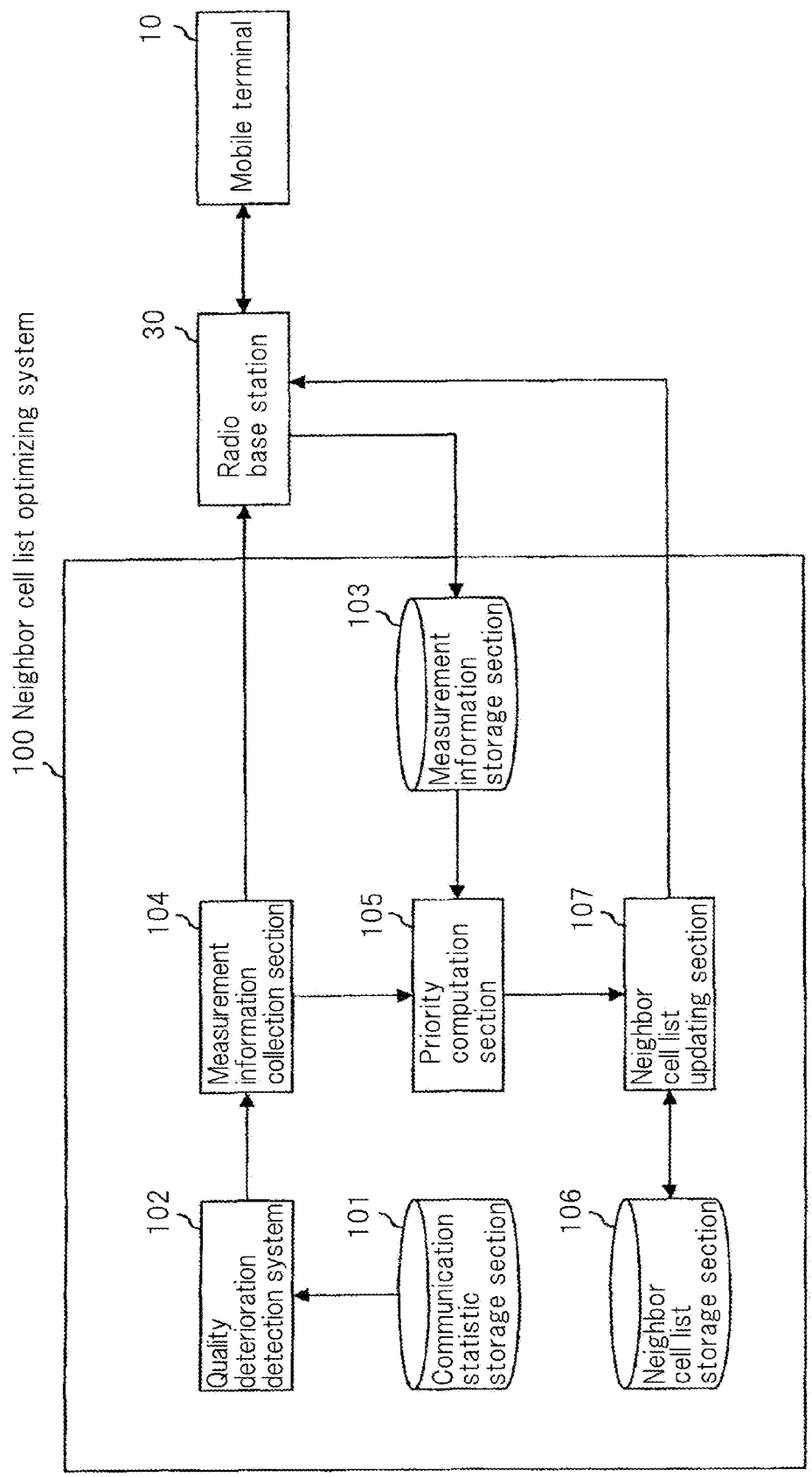
[FIG. 6] is a block diagram showing a structure of a neighbor cell list optimizing system according to a first exemplary embodiment.

FIG. 6 is a schematic diagram showing a structure of neighbor cell list optimizing system 100 according to a first exemplary embodiment.

Neighbor cell list optimizing system 100 shown in FIG. 6 has communication statistic storage section 101, quality deterioration detection section 102, measurement information storage section 103, measurement information collection section 104, priority computation section 105, neighbor cell list storage section 106, and neighbor cell list updating section 107.

Communication statistic storage section 101 is a region that stores communication traffic statistic information with respect to the operating radio communication system. Specific examples of the traffic statistic information are statistics of individual radio cells such as the number of handover attempts to each radio cell, the number of handover successes to each radio cell, and the number of handover failures to each radio cell.

Quality deterioration detection section 102 computes factors such as handover failure rate based on the traffic statistic information stored in communication statistic storage section 101, thereby detects radio cell whose communication quality has deteriorated, and designates the detected radio cell as a cell to be optimized.

Measurement information storage section 103 is a region that stores measurement information reported from mobile terminals 10 connected to a cell to be optimized, namely measurement information of radio communication qualities of the cell to be optimized and measurement information of radio communication qualities of neighbor cells that are in the vicinity of the cell to be optimized that are measured by mobile terminals 10 and that is to be reported to radio base stations 30. Specific examples of measurement information are received powers of pilot signals and signal-to-interference ratios transmitted from radio base stations 30 that manage the cell to be optimized and neighbor base stations 30 that manage neighbor cells.

Neighbor cells include listed cells and detected cells.

Measurement information collection section 104 decides an operation condition in which mobile terminal 10 that establishes a connection to a cell to be optimized is caused to report measurement information and set the decided operation condition to radio base station 30 that manages the cell to be optimized so as to collect measurement information reported from mobile terminal 10 to radio base station 30. The operation condition that has been set on radio base station 30 is reported to mobile terminal 10 through a downlink channel.

Priority computation section 105 acquires measurement information reported from each mobile terminal 10 that establishes a connection to a cell to be optimized from measurement information storage section 103 and computes the priorities of neighbor cells to be registered to the neighbor cell list based on the acquired measurement information.

Neighbor cell list storage section 106 is a region that stores a neighbor cell list that is a list of neighbor cells of a cell that radio base station 30 manages. The neighbor cell list may be initially a neighbor cell list that contains radio cells managed by radio base stations 30 which are selected as those close to radio base station 30 that manages the cell to be optimized or an empty neighbor cell list.

Neighbor cell list updating section 107 decides radio cells to be registered to an updated neighbor cell list based on the neighbor cells' priorities that are computed by priority computation section 105, notifies radio base station 30 of the updated contents, and updates the neighbor cell list with the updated contents.

Next, an operation of neighbor cell list optimizing system 100 will be described.

Figure 7:
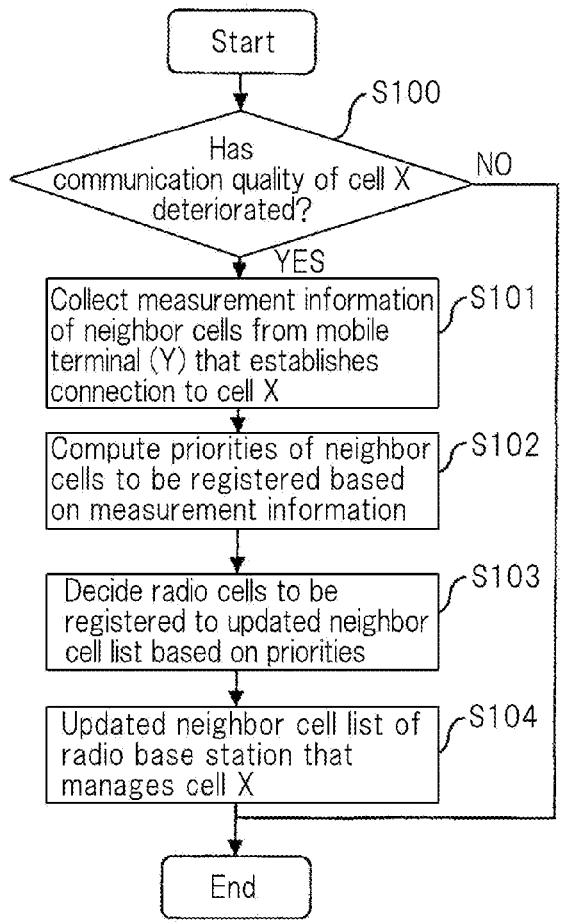
[FIG. 7] is a flowchart illustrating an operation of the neighbor cell list optimizing system shown in FIG. 6.

FIG. 7 is a flowchart illustrating the operation of neighbor cell list optimizing system 100.

Quality deterioration detection section 102 acquires traffic statistic information from communication statistic storage section 101 and detects any radio cell whose communication quality has deteriorated (at step S100). Specifically, quality deterioration detection section 102 computes the handover failure rate of each radio cell based on the number of handover attempts and the number of handover failures and detects any radio cell whose handover failure rate is equal to or higher than a threshold as a radio cell whose communication quality has deteriorated. In the following, the detected radio cell is designated as a cell to be optimized.

According to this exemplary embodiment, it is not essential to detect a radio cell whose communication quality has deteriorated at step S100. When step S100 is omitted, radio cells that all radio base stations 30 manage may be designated as cells to be optimized and neighbor cell lists may be periodically optimized.

When a cell to be optimized is detected at step S100, measurement information collection section 104 decides an operation condition in which mobile terminal 10 that establishes a connection to the cell to be optimized is caused to report measurement information and sets the decided operation condition to radio base station 30 that manages the cell to be optimized.

Mobile terminal 10 is notified of the operation condition that has been set to radio base station 30 through a downlink channel. Measurement information storage section 103 collects measurement information reported from mobile terminal 10 to radio base station 30 based on the operation condition and stores the collected measurement information (at step S101).

The operation condition in which mobile terminal 10 is caused to report measurement information to the cell to be optimized will be described after the description of the flowchart.

Priority computation section 105 computes the priorities of neighbor cells to be registered to a neighbor cell list based on the measurement information stored at step S101 (at step S102). Details of the priority computation method will be described later with reference to FIG. 8.

Neighbor cell list updating section 107 decides radio cells to be registered to a updated neighbor cell list based on the priorities computed at step S102 (at step S103). In addition, neighbor cell list updating section 107 compares an existing neighbor cell list stored in neighbor cell list storage section 106 with an updated neighbor cell list, identifies radio cells to be added or deleted, and decides an updated neighbor cell list. Moreover, neighbor cell list updating section 107 notifies radio base station 30 of the update contents of the neighbor cell list and causes radio base station 30 to update the neighbor cell list (at step S104). Details of the neighbor cell list deciding method will be described later with reference to FIG. 9.

Finally, neighbor cell list updating section 107 stores the updated neighbor cell list to neighbor cell list storage section 106 and then completes the process.

Next, the operation condition in which mobile terminal 10 is caused to report will be described.

In this exemplary embodiment, an example in which Expression (1) presented in Non-patent Literature 2 is used will be described.

[Mathematical Expression 1]

$$P_s + O_s < P_t + O_t \quad (1)$$

where Ps and Pt are received powers of pilot signals transmitted from radio base station 30 that manages a connected radio cell and radio base station 30 that manages a neighbor cell, respectively. Os and Ot are offset values of received powers where Os is applied to the received power of the pilot signal transmitted from radio base station 30 that manages the connected radio cell, whereas Ot is applied to the received power of the pilot signal transmitted from neighbor base station 30. Ot may be set to a value that differs in each neighbor cell.

When the operation condition given by Expression (1) is set to radio base station 30, mobile terminal 10 that establishes a connection to a radio cell that radio base station 30 manages is notified of the operation condition given by Expression (1). When the received powers of the pilot signals transmitted from radio base station 30 that manages the connected radio cell and neighbor base station 30 satisfy Expression (1), mobile terminal 10 is triggered to report the measurement information to radio base station 30.

When the condition given by Expression (1) is satisfied, mobile terminal 10 is triggered to report the measurement information to radio base station 30. Thus, Expression (1) may be referred to as a trigger condition.

When Expression (1) is rephrased to Expression (2)
[Mathematical Expression 2]

$$P_t - P_s > Th_{HO}$$

$$Th_{HO} = O_s - O_t \quad (2)$$

the parameter $Th_{HO}$ may be referred to as a handover determination threshold (handover threshold). This is because, when a handover execution determination is performed, Expression (1) is used as a trigger condition in which mobile terminal 10 is caused to report to radio base station 30 that the communication quality of the connected radio cell has deteriorated.

When the trigger condition given by Expression (1) is used for the handover execution determination, mobile terminal 10 normally measures the radio communication qualities of listed cells registered in the neighbor cell list.

On the other hand, according to this exemplary embodiment, measurement information collection section 104 requests mobile terminal 10 to measure radio communication qualities of listed cells and detected cells.

According to this exemplary embodiment, an example in which the trigger condition in which mobile terminal 10 is caused to report measurement information to radio base station 30 is the same as the condition in which the handover execution determination is performed is described. Alternatively, the trigger condition for listed cells may be different from the trigger condition for detected cells. Further alternatively, the trigger condition in which mobile terminal 10 is caused to report measurement information to radio base station 30 may be set to a lower value than the value of the parameter $Th_{HO}$ for the trigger condition in which the handover execution determination is performed so as to cause mobile terminal 10 to report measurement information to radio base station 30 before mobile terminal 10 reaches the position at which it performs a handover. Thus, the trigger condition in which mobile terminal 10 is caused to report measurement information to radio base station 30 may be different from the handover threshold at which the handover execution determination is performed.

In addition, according to this exemplary embodiment, an example in which measurement information collection section 104 requests all mobile terminals 10 that establish connections to a cell to be optimized to measure radio communication qualities is presented. However, it is because a load that is not small is imposed on the mobile terminal 10 is caused to measure radio communication qualities of radio cells, since mobile terminal 10 is imposed with the load not a few, part of mobile terminals 10 that establishes connections to the cell to be optimized may be requested to measure radio communication qualities in such a manner that part of mobile terminals 10 that establishes connections to the cell to be optimized are randomly selected at a predetermined rate and the selected mobile terminals may be caused to measure radio communication qualities.

In addition, according to this exemplary embodiment, an example in which mobile terminal 10 is requested to measure radio communication qualities of both listed cells and detected cells is presented. However, generally, the load imposed on mobile terminal 10 that measures the radio communication qualities of detected cells is higher than the load imposed on mobile terminal 10 that measures the radio communication qualities of listed cells. Thus, part of mobile terminals 10 requested to measure radio communication qualities of listed cells may be requested to measure the radio communication qualities of detected cells.

In addition, according to this exemplary embodiment, an example in which mobile terminal 10 is caused to measure the received power of a pilot signal transmitted from radio base station 30 as radio communication quality is presented. Alternatively, other factors of radio communication qualities such as a signal-to-interference ratio may be measured.

In addition, according to this exemplary embodiment, an example is presented in which the trigger condition given by Expression (1) is used as an operation condition. Alternatively, another condition may be used in such a manner that when Pt is equal to or higher than a predetermined threshold or the signal-to-interference ratio of a pilot signal transmitted from radio base station 30 is equal to or higher than a predetermined threshold, mobile terminal 10 may be caused to report measurement information to radio base station 30.

Figure 8:
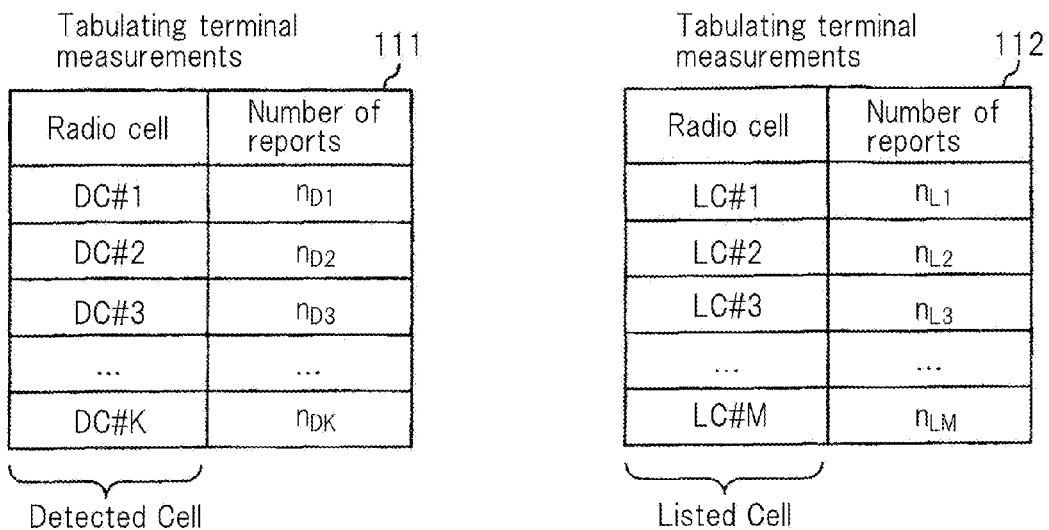
[FIG. 8] is a schematic diagram showing an example of management information managed by a priority computation section shown in FIG. 6.

FIG. 8 is a schematic diagram showing an example of management information that priority computation section 105 manages.

As shown in FIG. 8, priority computation section 105 manages tabulation table 111 that tabulates the number of reports received from mobile terminals 10 that represent radio communication quality regarding each detected cell, and tabulation table 112 that tabulates the number of reports received from mobile terminals 10 that represent radio communication quality regarding each listed cell as management information.

Priority computation section 105 tabulates only the number of reports stating that the received power of pilot signal is equal to or higher than a predetermined threshold. At this point, priority computation section 105 uses the same threshold of received power for detected cells and for listed cells. When mobile terminal 10 reports radio communication qualities of detected cells and radio communication qualities of listed cells to radio base station 30 in the same trigger condition, priority computation section 105 may tabulate all reports received from mobile terminal 10.

Priority computation section 105 designates the number of reports that represent measurement information for neighbor cells tabulated in a predetermined period as the priorities of neighbor cells to be registered to a neighbor cell list. At this point, if the total number of mobile terminals 10 that are requested to report measurement information of radio communication qualities for detected cells is different from the total number of mobile terminals 10 that are requested to report measurement information of radio communication qualities for listed cells, priority computation section 105 corrects the priorities based on the total number of these mobile terminals 10. Priority computation section 105 is notified of the total number of these mobile terminals 10 from measurement information collection section 104.

When the total number of mobile terminals 10 that are requested to report measurement information of radio communication qualities for detected cells and the total number of mobile terminals 10 that are requested to report measurement information of radio communication qualities for listed cells are $N_D$ and $N_L$, respectively ($N_D \neq N_L$), priority computation section 105 designates $n_D/N_D$ and $n_L/N_L$ that are normalized by dividing the number of reports $n_D$ of detected cells and the number of reports $n_L$ of listed cells by the total number of mobile terminals 10, $N_D$ and $N_L$, as the priorities of detected cells and priorities of listed cells, respectively. In this case, although it is preferable that mobile terminals 10 not be caused to redundantly report measurement information of radio cells in the tabulation period for n reports, redundant reports may be permitted.

When the number of reports $n_D$ for detected cells are designated as priorities, priority computation section 105 may designate a value of which the ratio of $N_L$ and $N_D$ ($N_D/N_L$) is multiplied by the number of reports for listed cells, (($N_D/N_L$)*$n_L$), as the priorities of listed cells.

Figure 9:
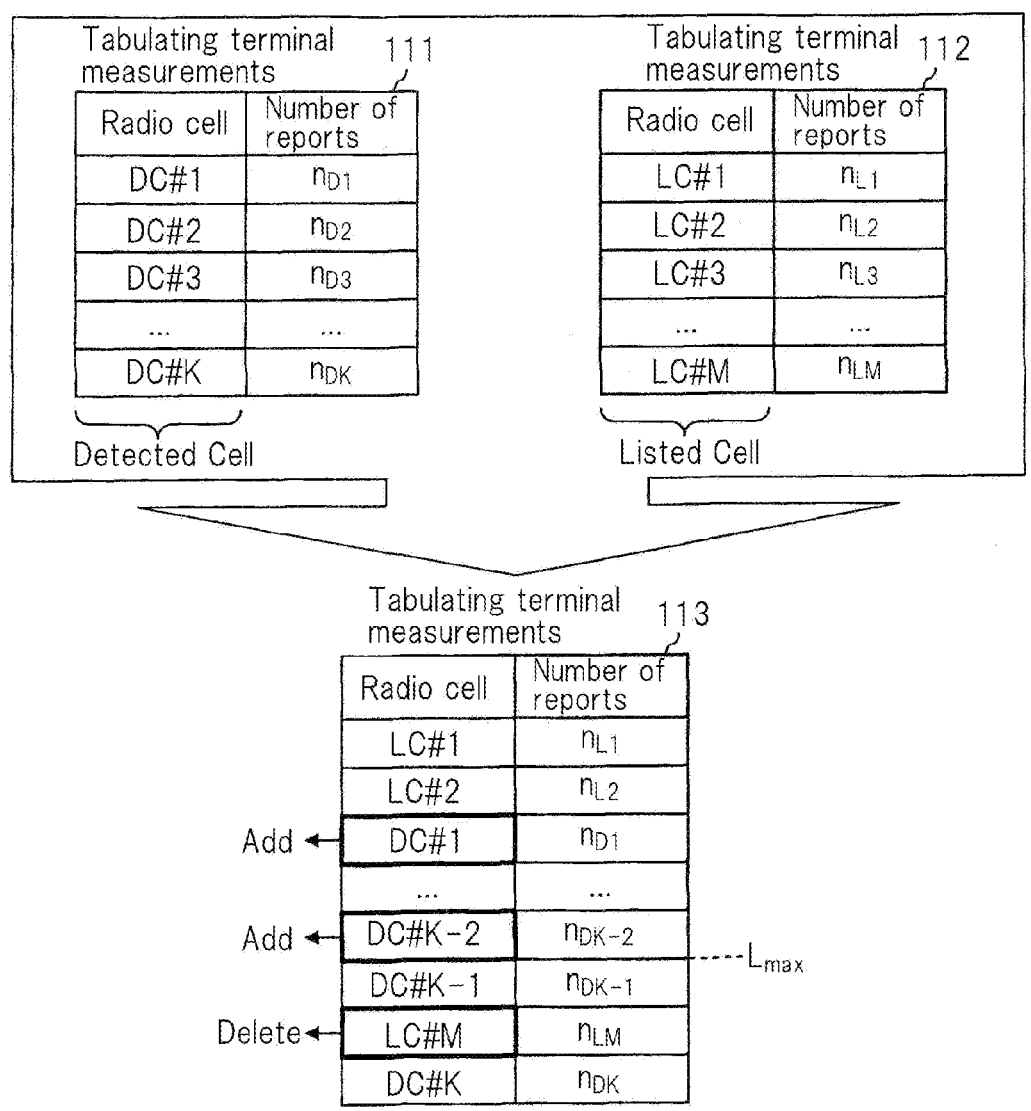
[FIG. 9] is a schematic diagram illustrating a neighbor cell list deciding method that a neighbor cell list updating section shown in FIG. 6 performs.

FIG. 9 is a schematic diagram illustrating a neighbor cell list updating method that neighbor cell list updating section 107 performs.

Neighbor cell list updating section 107 acquires the priorities of detected cells and listed cells, namely the number of reports of detected cells ($n_D$) and the number of reports of listed cells ($n_L$) from tabulation table 111 and tabulation table 112, respectively, along with identification number of radio cells and generates tabulation table 113 that contains identification number of radio cells arranged in descending order of the number of reports.

Thereafter, neighbor cell list updating section 107 extracts radio cells arranged in descending order of the priorities (number of reports) from tabulation table 113 up to an upper limit of radio cells ($L_{max}$) that can be registered to the neighbor cell list and designates the extracted radio cells as those to be registered to an updated neighbor cell list. At this point, radio cells whose number of reports are equal to or lower than a predetermined threshold ($Th_{Del}'$) may be deleted from the updated neighbor cell list.

Neighbor cell list updating section 107 designates detected cells of the extracted radio cells as those to be added to the existing neighbor cell list. In contrast, neighbor cell list updating section 107 designates listed cells that are not included in the extracted radio cells as those to be deleted from the existing neighbor cell list. In FIG. 9, DC#1 and DC#K-2 are radio cells to be added to the existing neighbor cell list, whereas LC#M is a radio cell to be deleted from the existing neighbor cell list.

Neighbor cell list updating section 107 notifies radio base station 30 of radio cells to be added to or to be deleted from the existing neighbor cell list and updates the neighbor cell list. In addition, neighbor cell list updating section 107 may notify radio base station 30 of the updated neighbor cell list so as to update the neighbor cell list.

Thus, according to this exemplary embodiment, neighbor cell list optimizing system 100 computes the priorities of neighbor cells to be registered to the neighbor cell list based on the number of reports that represent measurement information of radio communication qualities of listed cells and detected cells that are neighbor cells and decides radio cells to be registered to the neighbor cell list based on the computed priorities.

As a result, since the number of neighbor cells registered to a neighbor cell list is equal to or lower than the upper limit of neighbor cells that can be registered to the neighbor cell list, neighbor cells that exceed the maximum number of neighbor cells that can be registered to the neighbor cell list can be prevented from changing to radio cells that are to be registered to the neighbor cell list.

In addition, since neighbor cells are registered to a neighbor cell list based on only the priorities of the individual neighbor cells, it is not necessary to repeatedly register and delete neighbor cells to and from the neighbor cell list and thereby the updating operation for the neighbor cell list can be prevented from becoming unstable.

(Second Exemplary Embodiment)

Neighbor cell list optimizing system 200 according to a second exemplary embodiment is different from neighbor cell list optimizing system 100 according to the first exemplary embodiment in that when the number of reports received from mobile terminals 10 are tabulated, only reports for neighbor cells that are likely to be a handover destination are tabulated. To accomplish the foregoing operation, priority computation section 105 according to the second exemplary embodiment performs the following operations that are different from those that priority computation section 105 performs according to the first exemplary embodiment.

In other words, when priority computation section 105 according to this exemplary embodiment tabulates the number of reports received from mobile terminals 10 that establishes a connection to a cell to be optimized, priority computation section 105 tabulates only the number of reports for a neighbor cell that is likely to be a handover destination. At this point, a neighbor cell that is likely to be a handover destination is identified as a cell that has the highest radio communication quality in a plurality of neighbor cells.

Thus, according to this exemplary embodiment, when neighbor cell list optimizing system 200 tabulates the number of reports received from mobile terminals 10, neighbor cell list optimizing system 200 tabulates only the number of reports for neighbor cells that are likely to be a handover destination.

Thus, according to the first exemplary embodiment, since the number of reports for neighbor cells are tabulated without considering the likelihood of whether or not they be a handover destination, it is difficult to generate a neighbor cell list of neighbor cells that contains neighbor cells that are likely to be a handover destination. In contrast, according to the second exemplary embodiment, since only the number of reports for neighbor cells that are likely to be a handover destination are tabulated, a neighbor cell list that contains radio cells that are likely to be a handover destination can be generated.

(Third Exemplary Embodiment)

Neighbor cell list optimizing system 300 according to a third exemplary embodiment is different from neighbor cell list optimizing system according to the first and second exemplary embodiments in that the priorities of neighbor cells are computed by weighted average value of the number of reports received from mobile terminals 10 in a plurality of tabulation periods. To accomplish the foregoing operation, priority computation section 105 according to the third exemplary embodiment performs the following operations that are different from the operations that priority computation sections 105 performs according to the first and second exemplary embodiments.

In other words, according to the third exemplary embodiment, priority computation section 105 the weighted average value of the number of reports received from mobile terminals 10 for neighbor cells in an elapsed time after a tabulation period for each of the number of reports and computes the priorities of the neighbor cells based on the weighted average values.

FIG. 10 is a schematic diagram showing an example of management information that priority computation section 105 manages.

As shown in FIG. 10, priority computation section 105 manages tabulation table 114 that tabulates the number of reports received from mobile terminals 10 for individual detected cells in a predetermined tabulation period and weighted average values of the number of reports received from mobile terminals 10 in a plurality of predetermined past tabulation periods, and tabulation table 115 that tabulates the number of reports received from mobile terminals 10 for individual listed cells in a predetermined tabulation period and weighted average values of the number of reports received from mobile terminals 10 in a plurality of predetermined past tabulation periods as management information.

The weighted average values of the number of reports can be computed by for example Expression (3)

[Mathematical Expression 3]

$$M(i)=(1-\gamma)\cdot M(i-1)+\gamma\cdot n(i), (0<\gamma\leq 1, M(0)=0) \quad (3)$$

where M(i) is the weighted average values of the number of reports in i-th tabulation periods; n(i) is the tabulation values of the number of reports in the i-th tabulation periods; and γ is a fixed factor that is generally referred to as a forgetting factor.

When γ is smaller than 1 in Expression (3), weighted average values M(i−1) of the number of reports in a past tabulation period and the total values n(i) of the number of reports in a present tabulation period are weight-averaged. In this case, as γ is as close as 1, the weights of the tabulation number n(i) in the present tabulation period to the weighted average values M(i) become high. In contrast, when γ is 1, the weighted average values of the number of reports in the past tabulation periods are not weight-averaged and thereby the same tabulation values as those of the first exemplary embodiment are obtained.

Priority computation section 105 designates the weighted average values M(i) of the number of reports in a plurality of tabulation periods instead of the number of reports n(i) according to the first exemplary embodiment as the priorities of neighbor cells.

Thus, according to the third exemplary embodiment, neighbor cell list optimizing system 300 computes the priorities of neighbor cells based on the weighted average values of the number of reports in a plurality of tabulation periods.

According to the first exemplary embodiment, if the tabulation period for which radio cells registered to a neighbor cell list are decided based on the priorities that are computed based on the number of reports in a single tabulation period is short, an inappropriate radio cell may be added to or deleted from the neighbor cell list because of influence of temporary fluctuation such as mobility of mobile terminals 10 and fading of radio waves. In contrast, if a long tabulation period is set so as to prevent such a neighbor cell list from being inappropriate updated, changes of the relationship of neighbor cells due to installation and closure of radio base stations 30 may not quickly affect the neighbor cell list.

In contrast, according to the third exemplary embodiment, since radio cells to be added to or to be deleted from a neighbor cell list are decided based on the priorities that are computed based on the weighted average values of the number of reports received from mobile terminals 10 in an elapsed period after a tabulation period for each of the number of reports, while influence of temporary fluctuation is alleviated, the recent relationship of neighbor cells can be adequately reflected to the neighbor cell list.

(Fourth Exemplary Embodiment)

Neighbor cell list optimizing system 400 according to a fourth exemplary embodiment is different from those according to the first to third exemplary embodiments in that the priorities computed based on the number of reports received from mobile terminals 10 are corrected by the priorities that are computed based on traffic statistic information.

Figure 11:
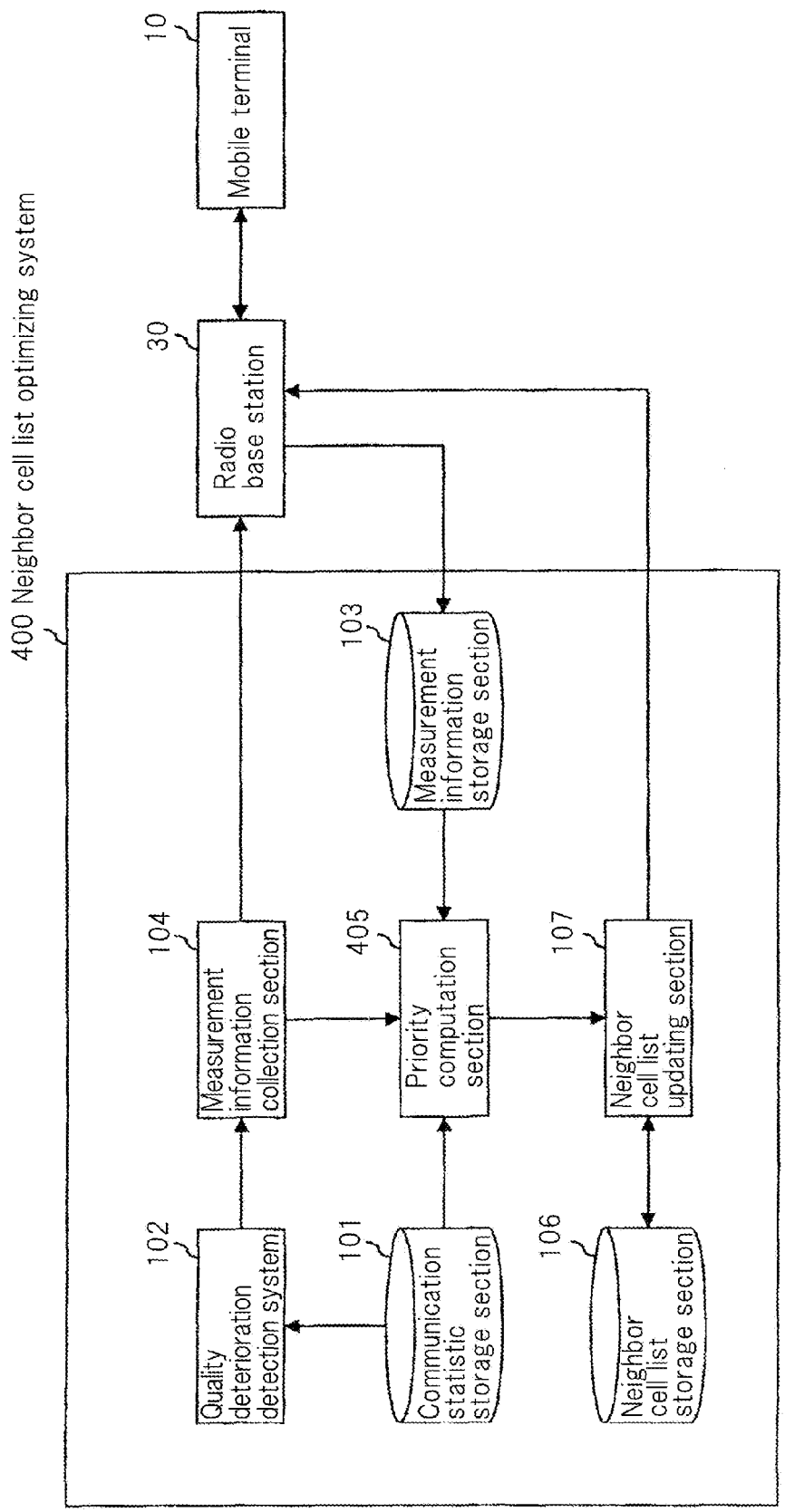
[FIG. 11] is a block diagram showing a structure of a neighbor cell list optimizing system according to a fourth exemplary embodiment.

FIG. 11 is a block diagram showing a structure of neighbor cell list optimizing system 400 according to the fourth exemplary embodiment.

Neighbor cell list optimizing system 400 shown in FIG. 11 is different from neighbor cell list optimizing systems 100 according to the first to third exemplary embodiments in that priority computation section 105 is substituted with priority computation section 405.

Priority computation section 405 acquires traffic statistic information from communication statistic storage section 101. Specifically, priority computation section 405 acquires the number of handover attempts from a cell to be optimized to any one of listed cells (A), the number of handover successes (S), the number of handover attempts to each of listed cells (a), and the number of handover successes to each of listed cells (s) with respect to handovers that take place in a tabulation period for reports received from mobile terminals 10.

Thereafter, priority computation section 405 computes the priorities of neighbor cells based on the traffic statistic information and designates the priorities that are computed based on the number of reports received from mobile terminals 10 and that are corrected by the priorities that are computed based on the traffic statistic information as the priorities of the neighbor cells.

Next, an operation of neighbor cell list optimizing system 400 according to this exemplary embodiment will be described.

Figure 12:
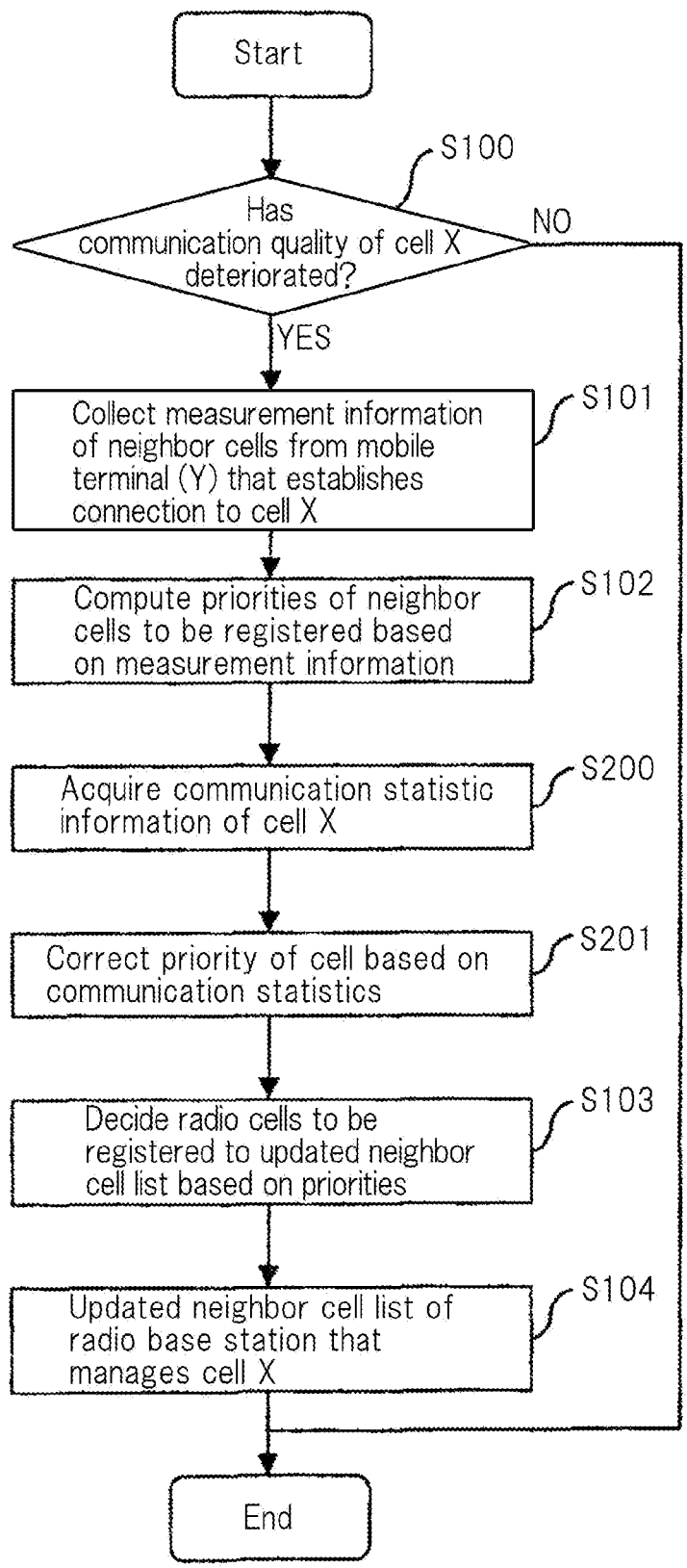
[FIG. 12] is a flowchart illustrating an operation of the neighbor cell list optimizing system shown in FIG. 11.

FIG. 12 is a flowchart illustrating the operation of neighbor cell list optimizing system 400. In FIG. 12, similar processes to those in FIG. 7 are denoted by similar reference numerals and their description will be omitted.

Priority computation section 405 acquires traffic statistic information with respect to a cell to be optimized from communication statistic storage section 101 (at step S200), corrects the neighbor cells' priorities that are computed based on the number of reports received from mobile terminals 10 with the priorities that are computed based on the acquired traffic statistic information (at step S201), and designates the corrected values as the priorities of the neighbor cells.

The priorities are corrected by averaging values of the priorities that are computed based on the number of reports received from mobile terminals 10 and the priorities that are computed based on the traffic statistic information with weights.

As a priority correcting method, Expression (4) can be used.

[Mathematical Expression 4]

$$R_m = (1-\alpha) \cdot r_m + \alpha \cdot r_{pm}, (0 \leq \alpha < 1) \quad (4)$$

where $R_m$ is corrected priorities.

In addition, $r_m$ is priority that is computed based on the number of reports received from mobile terminals 10 at step S102. However, $r_m$ is normalized value as described above in the first exemplary embodiment. In contrast, $r_{pm}$ is priority that is computed based on the traffic statistic information. $r_{pm}$ is value in which the number of handover attempts to a listed cell (a) is normalized by the number of handover attempts to any one of listed cells (A), (a/A), or the number of handover successes to a listed cell (a) is normalized by the total number of handover successes (S) (a/S).

$\alpha$ is a weighting coefficient and is 0 when the traffic statistic information cannot be acquired for neighbor cells so as to compute their priorities; $\alpha$ is a value equal to or higher than 0 and lower than 1 when the traffic statistic information can be acquired.

Like the third exemplary embodiment, $R_m$ can be weight-averaged using $r_m$ and $r_{pm}$ in a plurality of past tabulation periods as given by Expression (5)

[Mathematical Expression 5]

$$R_m(i) = (1-\gamma) \cdot R_m(i-1) + \gamma[(1-\alpha) \cdot r_m(i) + \alpha \cdot r_{pm}(i)],$$
$$(0 < \gamma \leq 1, 0 \leq \alpha < 1, R_m(0) = 0) \quad (5)$$

Neighbor cell list updating section 107 extracts neighbor cells in descending order of priorities ($R_m$) of neighbor cells that have been detected by mobile terminals 10 and from which the traffic statistic information has been acquired up to an upper limit of radio cells that can be registered to the neighbor cell list ($L_{Max}$), updates the extracted neighbor cells, and then registers them to the neighbor cell list. At this point, as in the first exemplary embodiment, neighbor cells whose number of reports received from mobile terminals 10 is equal to or lower than the threshold ($Th_{Del}'$) may be deleted from the updated neighbor cell list.

Thus, according to this exemplary embodiment, neighbor cell list optimizing system 400 designates the priorities that are computed based on the number of reports received from mobile terminals 10 and that are corrected by the traffic statistic information as the priorities of the neighbor cells.

According to the first to third exemplary embodiments, if the trigger condition based on which mobile terminal 10 is caused to report is different from the condition in which the handover execution determination is performed, the correlation between the number of reports received from mobile terminals 10 and the number of handover attempts becomes low and thereby it may be difficult to register neighbor cells that have an expectation of many handover attempts to the neighbor cell list.

In contrast, according to the fourth exemplary embodiment, since neighbor cells to be registered to the neighbor cell list are decided based on the priorities that are corrected based on the real handover achievements, neighbor cells having an expectation of many handover tries can be registered to the neighbor cell list.

(Fifth Exemplary Embodiment)

Neighbor cell list optimizing system 500 according to a fifth exemplary embodiment is different from neighbor cell list optimizing system 400 according to the fourth exemplary embodiment in that priorities ($R_m$) that are computed according to the fourth exemplary embodiment are corrected based on the priorities exemplary computed based on coverage between a cell to be optimized and neighbor cells (geographic ranges of radio cells).

Figure 13:
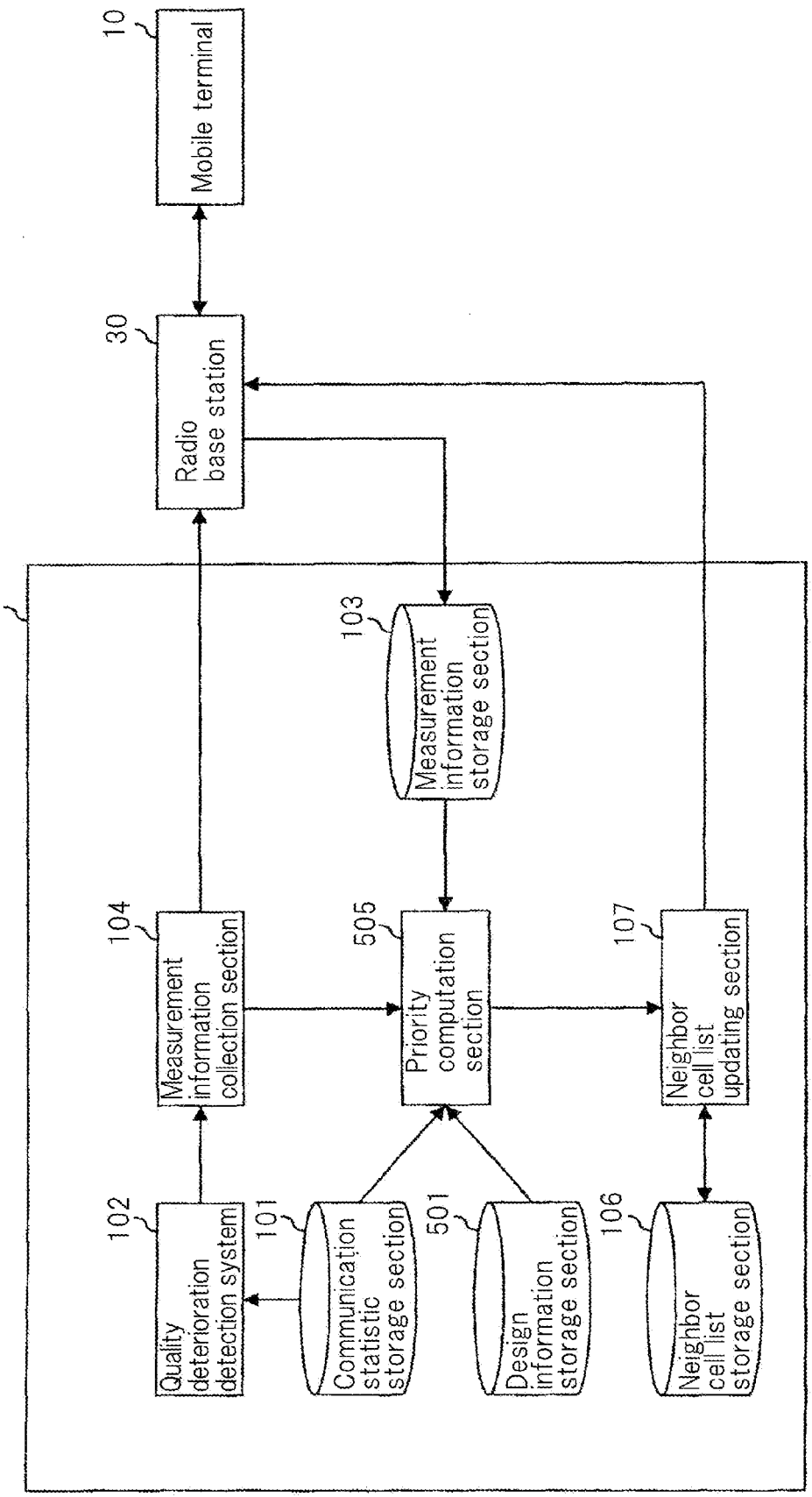
[FIG. 13] is a block diagram showing a structure of a neighbor cell list optimizing system according to a fifth exemplary embodiment.

FIG. 13 is a block diagram showing a structure of neighbor cell list optimizing system 500 according to the fifth exemplary embodiment.

Neighbor cell list optimizing system 500 shown in FIG. 13 is different from neighbor cell list optimizing system 400 according to the fourth exemplary embodiment in that design information storage section 501 is newly provided and in that priority computation section 405 is substituted with priority computation section 505.

Design information storage section 501 is a region that stores radio coverage information with respect to a cell to be optimized and neighbor cells that are in the vicinity of the cell to be optimized. The radio coverage information is information that defines a geographical range of a radio cell. The radio coverage information can be generally estimated from design information such as the transmission power of radio base station 30 that manages a radio cell and the mounting angle of an antenna of radio base station 30.

Priority computation section 505 acquires the radio coverage information from design information storage section 501 and corrects priorities (Rm) that are computed according to the method presented in the fourth exemplary embodiment using the priorities that are computed based on the acquired radio coverage information.

Next, an operation of neighbor cell list optimizing system 500 according to the fifth exemplary embodiment will be described.

Figure 14:
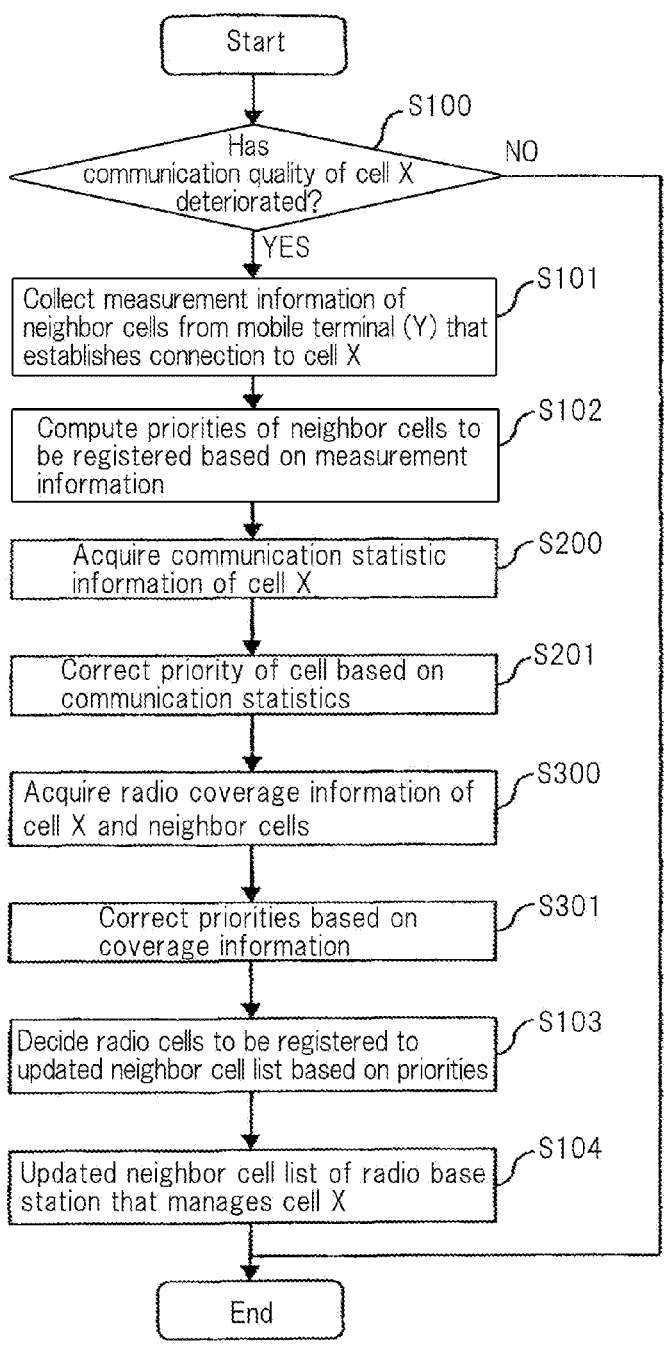
[FIG. 14] is a flowchart illustrating an operation of the neighbor cell list optimizing system shown in FIG. 13.

FIG. 14 is a flowchart illustrating an operation of neighbor cell list optimizing system 500. In FIG. 14, similar processes to those shown in FIG. 12 are denoted by similar reference numerals and their description will be omitted.

Priority computation section 505 acquires radio coverage information with respect to a cell to be optimized and neighbor cells that are in the vicinity of the cell to be optimized from design information storage section 501 (at step S300). In addition, priority computation section 505 computes the priorities of the neighbor cells based on the radio coverage information, corrects the priorities (Rm) that are computed at step S201 using the computed priorities (at step S301), and then designates the corrected values as the priorities of the neighbor cells.

The priorities are corrected by averaging the priorities (Rm) that are computed at step S201 and the priorities that are computed based on the radio coverage information with weights.

As a priority correcting method, Expression (6) can be used.

[Mathematical Expression 6]

$$R = (1-w) \cdot R_m + w \cdot R_p, \quad (0 \leq w \leq 1) \quad (6)$$

where $R_m$ is the priorities that are computed at step S201; $R_p$ is the priorities that are computed based on the radio coverage information. w is a weighting coefficient that is equal to or higher than 0 and lower than 1.

Figure 15:
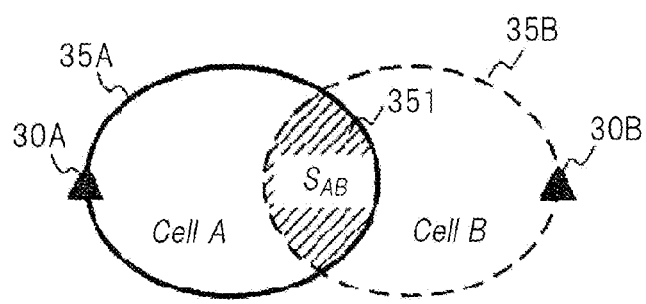
[FIG. 15] is a schematic diagram showing an example of the relationship of arrangements of a cell to be optimized and neighbor cell according to the fifth exemplary of the present invention.
Figure 16:
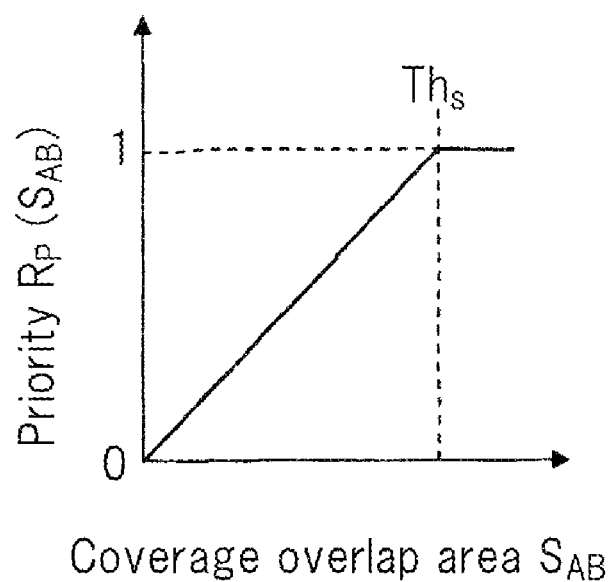
[FIG. 16] is a schematic diagram showing an example of an evaluation function used when a priority computation section shown in FIG. 13 computes priorities.

With reference to FIG. 15 and FIG. 16, an example of a computation method for priorities Rp based on the radio coverage information will be described.

FIG. 15 is a schematic diagram showing the relationship of arrangements of a cell to be optimized (35A) that radio base station 30A manages and neighbor cell (35B) that radio base station 30B manages.

In FIG. 15, the coverage of the cell to be optimized overlaps with the coverage of the neighbor cell in range 351 by an overlap area $S_{AB}$.

FIG. 16 is a schematic diagram showing an example of an evaluation function used to compute the priority Rp based on the radio coverage information.

As shown in FIG. 16, the priority Rp that is computed based on the radio coverage information is obtained as an output of an evaluation function that inputs the overlap area $S_{AB}$ of the coverage of optimization object cell (35A) and the coverage of neighbor cell (35B).

This exemplary embodiment presents an example in which the priorities that are computed according to the fourth exemplary embodiment are corrected using the priorities that are computed based on the radio coverage information. However, the present invention is not limited to such an example. Alternatively, the priorities that are computed according to the first to third exemplary embodiments can be corrected using the priorities that are computed based on the radio coverage information.

Thus, neighbor cell list optimizing system 500 according to this exemplary embodiment designates the priorities that are computed based on the number of reports received from mobile terminals 10 or based on the traffic statistic information and that are corrected using the priorities that are computed based on the radio coverage information as the priorities of the neighbor cells.

According to the first to fourth exemplary embodiments, since neighbor cells to be registered to a neighbor cell list are decided based on the number of reports received from mobile terminals 10 or based on the priorities that are computed based on the traffic statistic information, if influence of temporary fluctuation such as mobility of mobile terminals 10 and fading of radio waves is large, since neighbor cells that should not be added to or deleted from the neighbor cell list are added to or deleted from the neighbor cell list, the updating operation for a neighbor cell list may become unstable.

In contrast, according to the fifth exemplary embodiment, since neighbor cells to be registered to a neighbor cell list are decided based on the priorities that are corrected also based on coverage of a cell to be optimized and neighbor cells, the influence of temporary fluctuation can be alleviated and the updating operation for the neighbor cell list can be prevented from becoming unstable.

The present invention is not limited to the radio communication system shown in FIG. 2. Instead, without departing from the spirit of the present invention, the present invention may be applied to a radio communication system that is provided with a radio base station control device arranged between mobile communication core network 50 and radio base station 30 and also applied to a radio communication system where the function of the neighbor cell list optimizing system is incorporated in a radio based station control device or radio base station 30. In addition, the present invention may be also applied to the case in which a radio base station management device is arranged between the neighbor cell list optimizing system and radio base station 30.

An example in which the neighbor cell list optimizing system manages tabulated results of measurement information of radio communication qualities measured by mobile terminals 10 was presented. Alternatively, tabulated results may be managed in a base station control device or radio base station 30. Further alternatively, when radio base station 30 is provided with a function that is equivalent to the measurement function for radio communication qualities with which mobile terminal 10 is provided, radio base station 30 may measure the radio communication qualities.

In addition, according to the foregoing first to fifth exemplary embodiments, an example in which the radio communication system is provided with a neighbor cell list optimizing system as well as radio base stations 30 and in which the neighbor cell list optimizing system updates a neighbor cell list with which radio base station 30 is provided was presented. However, the present invention is not limited to such an example. Alternatively, radio base station 30 may update a neighbor cell list with which radio base station 30 itself is provided.

Measurement information, traffic statistic information, and radio coverage information are those that radio base station 30 can collect or store. Radio base station 30 can compute the priorities of neighbor cells based on such information, decide radio cells to be registered to the neighbor cell list with which radio base station 30 itself is provided, and update the neighbor cell list.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

The present application is based upon and claims the benefit of priority from Japanese patent application No. 2009-263782, filed on Nov. 19, 2009, the disclosure of which is incorporated herein in its entirety by reference.

The invention claimed:

1. A radio communication system, comprising:
   a mobile terminal;
   a base station that manages a cell to which said mobile terminal establishes a connection and that is provided with a neighbor cell list to which specific neighbor cells, that are candidates of a handover destination cell for said mobile terminal; and
   a neighbor cell list updating unit that updates the neighbor cell list provided in said base station,
   wherein said mobile terminal measures radio communication qualities of neighbor cells that are in the vicinity of said cells and reports measurement information that represents radio communication qualities of the neighbor cells in which the measured radio communication qualities exceed a predetermined threshold to said base station, and
   wherein said neighbor cell list updating unit includes:

a priority computation section that computes priorities of said neighbor cells to be registered to said neighbor cell list based on said measurement information reported to said base station; and a neighbor cell list updating section that registers neighbor cells to said neighbor cell list in descending order of the neighbor cells' priorities that are computed by said priority computation section up to an upper limit of radio cells that can be registered to said neighbor cell list, wherein said priority computation section counts the number of reports of measurement information of said neighbor cells in a predetermined counting period and computes the priorities of the neighbor cells based on the counted number of reports, wherein said priority computation section computes a weighted average value of the number of reports for said neighbor cells in an elapsed time after a tabulation period and computes the priorities of the neighbor cells based on the weighted average values.

2. The radio communication system according to claim 1, wherein said priority computation section counts the number of reports only for a neighbor cell having the highest radio communication quality from among the plurality of neighbor cells when said mobile terminal reports measurement information of a plurality of neighbor cells at a time.

3. The radio communication system according to claim 1, wherein said priority computation section computes the priorities of said neighbor cells and then corrects the priorities of the neighbor cells based on traffic statistic information of the neighbor cells.

4. The radio communication system according to claim 3, wherein said traffic statistic information includes at least one from among the number of handover attempts to said neighbor cells and the number of handover successes.

5. The radio communication system according to claim 4, wherein said priority computation section computes the priorities of said neighbor cells and then corrects the priorities of the neighbor cells based on the ratio of the number of handover attempts to the neighbor cells and the number of handover attempts to any one of all the neighbor cells or the ratio of the number of handover successes to the neighbor cells and the number of handover successes to any one of all the neighbor cells.

6. The radio communication system according to claim 1, wherein said neighbor cell list updating unit further includes:

a design information storage section that stores coverage information that represents coverage that is a geographical range of each of said cell and neighbor cells, and wherein said priority computation section computes the priorities of said neighbor cells and then corrects the priorities of the neighbor cells based on the coverage information of the neighbor cells.

7. The radio communication system according to claim 6, wherein said priority computation section computes the priorities of said neighbor cells and then corrects the priorities of the neighbor cells based on an overlap area of the coverage of said cell and the coverage of the neighbor cells.

8. The radio communication system according to claim 1, wherein the value of said threshold that said mobile terminal uses when it reports the measurement information of neighbor cells registered in said neighbor cell list is the same as the value of the threshold that said mobile terminal uses when it reports the measurement information of neighbor cells not registered in said neighbor cell list.

9. The radio communication system according to claim 1, wherein the value of said threshold that said mobile terminal uses when it reports the measurement information of neighbor cells registered in said neighbor cell list is different from the value of the threshold that said mobile terminal uses when it reports the measurement information of neighbor cells not registered in said neighbor cell list.

10. The radio communication system according to claim 1, further comprising:

a neighbor base station that manages at least one of said neighbor cells and transmits a first pilot signal, wherein said base station transmits a second pilot signal, and wherein said mobile terminal measures at least received powers or signal-to-interference ratios of said first and second pilot signals.

11. The radio communication system according to claim 10, wherein said mobile terminal measures at least a received power of said first pilot signal or a signal-to-interference ratio of said first pilot signal or a ratio of a received power of said second pilot signal and a received power of said first pilot signal or a ratio of a signal-to-interference ratio of said second pilot signal and a signal-to-interference ratio of said first signal as the radio communication qualities of said neighbor cells and reports said measurement information to said base station if the measured radio communication qualities exceed said threshold.

12. The radio communication system according to claim 1, further comprising another said mobile terminal that respectively measures the radio communication quality of neighbor cells other than said specific neighbor cells.

13. The radio communication system according to claim 12, wherein said neighbor cell list updating unit further comprises:

an information collection section that designates said mobile terminals as said first and second mobile terminals, and wherein said information collection section designates part of mobile terminals that have been designated as said first mobile terminals as said second mobile terminals.

14. The radio communication system according to claim 13, wherein said priority computation section computes the priorities of said neighbor cells and then corrects the priorities of the neighbor cells based on the ratio of the number of said first mobile terminals and the number of said second mobile terminals.

15. A neighbor cell list updating device that updates a neighbor cell list which includes specific neighbor cells that are candidates of a handover destination cell for a mobile terminal comprising:

a priority computation section that computes priorities of neighbor cells, which are in the vicinity of said cell, to be registered to said neighbor cell list based on measurement information that represents radio communication qualities of neighbor cells in which the measured radio communication qualities exceed a predetermined threshold; and a neighbor cell list updating section that registers neighbor cells in descending order of the neighbor cells' priorities that are computed by said priority computation section up to an upper limit of radio cells that can be registered to said neighbor cell list and updates said neighbor cell list, wherein said priority computation section counts the number of reports of measurement information of said neighbor cells in a predetermined counting period and computes priorities of the neighbor cells based on the counted number of reports, wherein said priority computation section computes a weighted average value of the number of reports for said neighbor cells in an elapsed time after a tabulation period and computes the priorities of the neighbor cells based on the weighted average values.

16. A base station that manages a cell and that updates a neighbor cell list which includes specific neighbor cells that are candidates of a handover destination cell for a mobile terminal, comprising:

a priority computation section that computes priorities of neighbor cells, which are in the vicinity of said cell, to be registered to said neighbor cell list based on measurement information that represents radio communication qualities of the neighbor cells in which the measured radio communication qualities exceed a predetermined threshold; and a neighbor cell list updating section that registers neighbor cells to said neighbor cell list in descending the order of the neighbor cells' priorities that are computed by said priority computation section up to an upper limit of radio cells that can be registered to said neighbor cell list and updates said neighbor cell list, wherein said priority computation section counts the number of reports of measurement information of said neighbor cells in a predetermined counting period and computes priorities of the neighbor cells based on the counted number of reports, wherein said priority computation section computes a weighted average value of the number of reports for said neighbor cells in an elapsed time after a tabulation period and computes the priorities of the neighbor cells based on the weighted average values.

17. A neighbor cell list updating method applied for a neighboring cell list updating device that updates a neighbor cell list which includes specific neighbor cells that are candidates of a handover destination cell for a mobile terminal, comprising:

computing priorities of neighbor cells, which are in the vicinity of said cell, to be registered to said neighbor cell list based on measurement information that represents radio communication qualities of neighbor cells in which the measured radio communication qualities exceed a predetermined threshold; and registering neighbor cells in descending order of the neighbor cells' priorities that are computed by said priority computation up to an upper limit of radio cells that can be registered to said neighbor cell list and updating said neighbor cell list, wherein said priority computation counts the number of reports of measurement information of said neighbor cells in a predetermined counting period and computes priorities of the neighbor cells based on the counted number of reports, wherein said priority computation computes a weighted average value of the number of reports for said neighbor cells in an elapsed time after a tabulation period and computes the priorities of the neighbor cells based on the weighted average values.

* * * * *